Sept. 25, 1951 W. H. BASELT 2,568,703
BRAKE HANGER
Filed Jan. 21, 1949 2 Sheets-Sheet 1
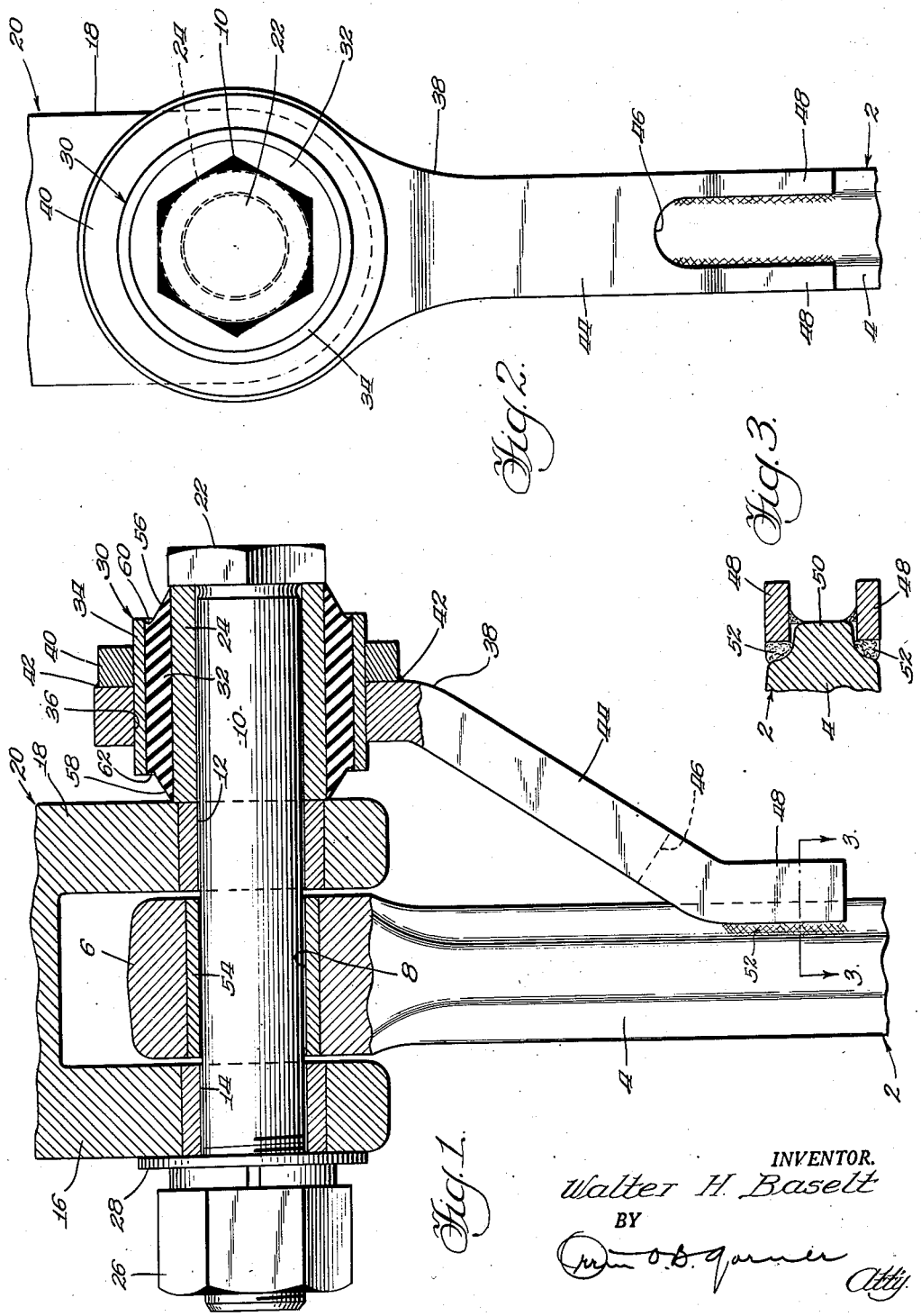
INVENTOR.
Walter H. Baselt
BY Sept. 25, 1951 W. H. BASELT 2,568,703
BRAKE HANGER
Filed Jan. 21, 1949 2 Sheets-Sheet 2
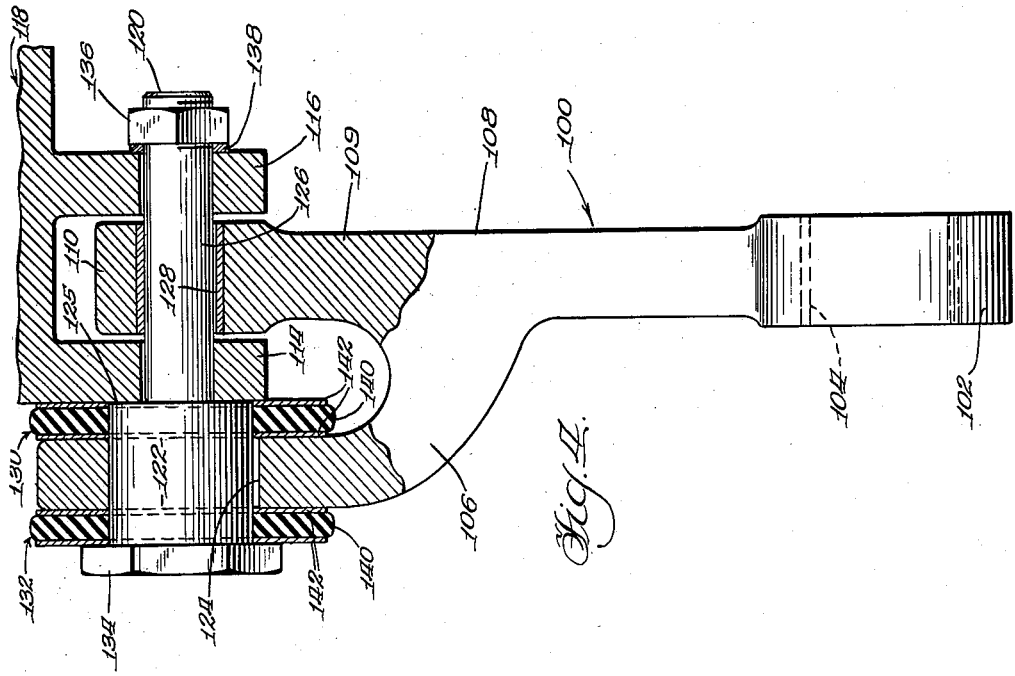
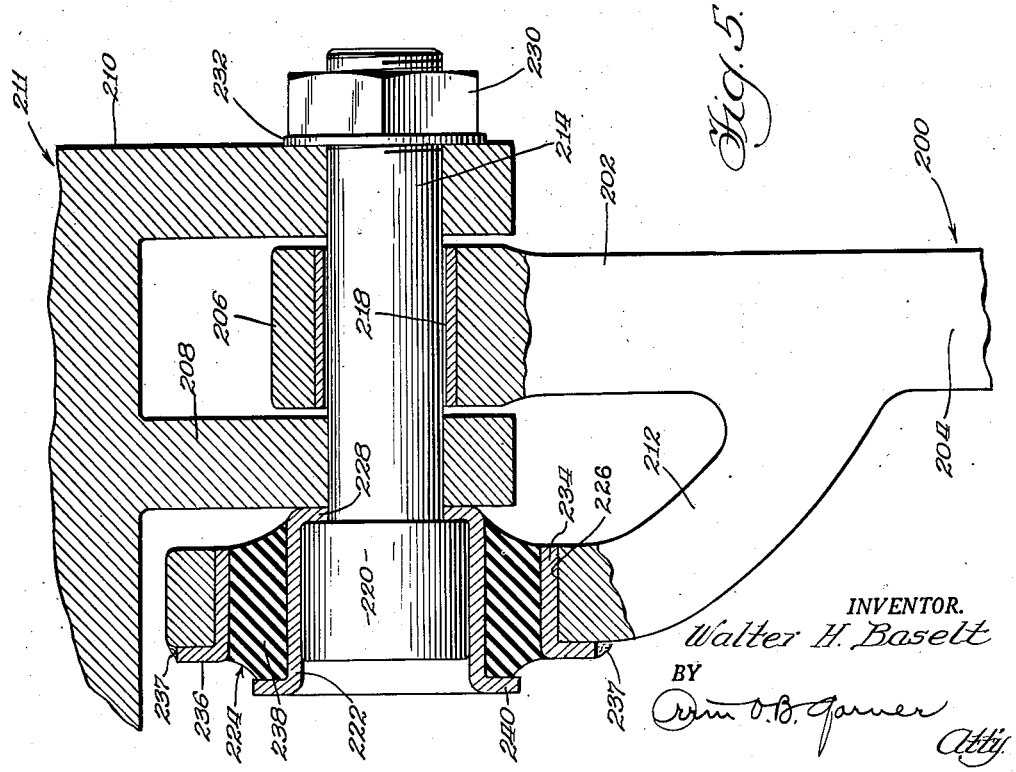
INVENTOR.
Walter H. Baselt
BY
Atty.

Patented Sept. 25, 1951

2,568,703

UNITED STATES PATENT OFFICE 2,568,703

BRAKE HANGER

Walter H. Baselt, Flossmoor, Ill., assignor to American Steel Foundries, Chicago, Ill., a corporation of New Jersey Application January 21, 1949, Serial No. 71,960

15 Claims. (Cl. 188—206)

1

This invention relates to railway brake equipment and more particularly to brake beam hanger assemblies incorporating novel means for restraining swinging of the rigging.

Brake equipment, especially on cars operated at high speeds, is subjected to severe vibrations, which, together with normal usage, cause the connections between the parts of the rigging to wear rapidly. Eventually these connections loosen sufficiently to accommodate excessive free swinging of the rigging, which is induced by service movements of the associated car. Free swinging accentuates wear and has been known to become so violent as to break certain parts.

It will be understood that the brakes of the type under consideration include friction elements designed to engage the treads of the wheels of the associated truck. The brake rigging which moves the friction elements to applied and released positions is designed to maintain the friction elements in proper alignment with the wheels. In order to accomplish this purpose it is necessary to restrain swinging movements of the brake rigging for otherwise the friction elements are shifted out of alignment with the wheels, resulting in the friction elements engaging the wheel flanges or only portions of the treads of the wheels so that the friction elements are worn unevenly and rapidly.

The general object of the invention is to provide a novel brake hanger assembly and connection between the assembly and its support, effective to restrain swinging of the assembly and thus the brake parts connected thereto.

A more specific object of the invention is to provide a hanger with a control arm wherein the control arm is resiliently connected to the support means and is effective to restrain pendulous movements of the hanger.

Another object of the invention is to provide a novel brake hanger and control assembly which may be readily incorporated in brake equipment presently in use and connected to existing brake hanger supports or brackets.

A further object of the invention is to provide an inexpensive brake hanger and control assembly of simple, rugged, and efficient form which may be readily applied or removed with respect to an associated support.

A different object of the invention is to arrange the resilient connection between the control arm and the support in such manner that it will be effective to release the brakes, position the beam radially, and reduce noise and wear between the pin and the hanger.

2

These and other objects of the invention will become more apparent from the specification and the drawings, wherein:

Figure 1 is a fragmentary front view of one form of brake hanger assembly as attached to a support, the upper end of the hanger assembly and the support being shown in transverse vertical section;

Figure 2 is a side elevational view taken from the right of Figure 1;

Figure 3 is a fragmentary sectional view taken substantially on the line 3—3 of Figure 1; and Figures 4 and 5 illustrate modifications of the invention and are in general views comparable to Figure 1.

Describing the invention in detail and referring first to the embodiment shown in Figures 1 to 3, inclusive, the hanger assembly comprises a generally vertical hanger 2 of conventional design and it will be understood that the lower end of the hanger (not shown) is formed and arranged for connection to an associated brake rigging part, such as a brake beam. The hanger 2 comprises intermediate its ends a body part 4 and at its upper end a head 6 which is provided with a transverse bushed opening 8. A pivot pin 10 extends through the opening 8 and through aligned bushed openings 12 and 14 in the spaced lugs or ears 16 and 18 disposed at opposite sides of the head 6 of the hanger. The ears 16 and 18 are formed on a support bracket 20 which may be a part of the truck frame (not shown). The hanger is thus afforded pivotal support from the bracket 20 and it will be observed in Figure 1 that due to manufacturing tolerances the opening 8 is slightly larger than the pin 10 whereby the hanger is accommodated pendulous lateral swinging on the pin. One end of the pin is provided with a head 22 which abuts against the outer end of a sleeve 24 mounted on the pin and abutting at its inner edge against the external side of the ear 18. The pin 10 is secured to the bracket 20, and the sleeve is held tightly against rotation on the pin and secured to the bracket by means of a nut 26 which is threaded on the end of the pin extending outwardly of the ear 16 of the support bracket. The nut 26 may bear against the washer 28 which may seat against the external side of ear 16.

The sleeve 24 forms the inner part of a resilient unit, generally designated 30, said resilient unit comprising, in addition to the sleeve 24, a resilient bushing 32, such as rubber, mounted on and surrounding sleeve 24 and preferably adhered thereto as by vulcanizing. A cylindrical metallic sleeve 34 is mounted over the bushing 32 and preferably connected thereto, the sleeve 34 being press-fitted within a complementary opening 36 in the upper end of a control arm 38 which is disposed at one side of the hanger 2. An annular bearing member 40 may also be press-fitted onto the sleeve 34 in abutment with the control arm 38. The bearing member may be welded to the control arm as at 42, 42 and is designed to afford with the control arm a large bearing against the sleeve 34. The control arm may have a shank portion 44 disposed immediately below the resilient unit 30 and arranged diagonally toward the hanger 2. The lower end of the control arm may be bifurcated as at 46 to provide spaced legs 48, 48 bent substantially parallel to the body portion 4 of the hanger 2 and embracing a portion 50 of the body of the hanger in an area intermediate the ends of said hanger body. The legs 48 may be welded as at 52 to the portion 50 whereby the hanger and the control arm are formed as a unitary structure. It will be apparent that the brake hanger assembly as described is easily connected and dismantled with respect to the support and is simple in design and is adapted to be applied to a standard type of support or brake hanger bracket. The hanger and its control arm are pivoted on a common axis and are rotatable together on said axis. Rotation of the hanger and the control arm is resisted by the resilient unit which, during rotation of the hanger and control arm, is stressed in shear. Lateral swinging movements of the hanger, as permitted by the clearance between the bushing 54 in the head 6 of the hanger and the pin 10 which increases with wear, is restrained by the resilient unit by compression of the bushing 32 between sleeves 24 and 34. It will be understood that the control arm is movable with the sleeve 34 and that the sleeve 34, being connected to the resilient bushing as by vulcanizing, is effective to stress the bushing in shear and in compression. It will be apparent that the weight of the brake rigging is supported principally by the hanger on the pin and that any forces applied to the hanger during braking application is transmitted from the hanger to the pin to the support bracket, whereby overcompression of the resilient bushing is prevented. Direct lateral movement of the hanger is also yieldingly resisted by the bushing 32 in shear. It will be noted that the outer sleeve 34 is shorter than the inner sleeve 24 and is centered with respect thereto and that the resilient bushing 32 is tapered at its ends as at 56 and 58 toward the sleeve 24 and is radiused as at 60 and 62 adjacent the ends of the outer sleeve 34 in order to prevent the ends of the outer sleeve from cutting into the bushing and to accommodate flow of the material of the bushing during compression thereof. It will be understood that the unit 30 may be a single piece of rubber interposed between the arm 38 and the pin 10 and compressed between the head 22 and lug 18.

Referring now to Figure 4 illustrating another embodiment of the invention, the brake hanger 100 comprises a head 102 at its lower end with a bushed opening 104 adapted for connection to an associated brake part, such as a brake beam. The upper end of the hanger is bifurcated to provide a control arm or leg 106, extending from the body portion 108 of the hanger intermediate the ends thereof, and an extension or leg 109 of the body portion terminating in a head 110.

The head 110 of the hanger is received between spaced lugs or ears 114 and 116 of a support bracket 118 and the control arm extends around the external side of lug 114. The extension 109 and arm 106 are thus intercalated with the lugs 114 and 116. The hanger is pivoted to the bracket or support 118 by a pin 120, said pin having an enlarged annular portion 122 extending through a complementary opening 124 in the upper end of the control arm 106. The enlarged portion 122 provides a shoulder 125 which abuts against the external side of ear 114. The pin has a reduced portion 126, which extends through openings in the ears 114 and 116 and through a bushed opening 128 in the head 110 of the hanger. The pin thus affords a pivotal connection between the hanger structure and the support, the hanger proper and and the control arm being pivoted on a common axis. The openings 124 in the arm and 128 in the hanger are shown slightly worn in the drawings whereby the hanger is accommodated lateral pendulous movement. It will be appreciated that the pin does not fit tightly in these openings even when the parts are new due to manufacturing tolerance, and even if initially tight, the pin and the openings would wear after some use.

In order to control rotational and lateral movement of the hanger, a pair of resilient units 130 and 132 are provided at opposite sides of the upper end of the control arm, said resilient units being sleeved onto the enlarged portion 122 of the pin and being compressed, respectively, between the ear 114 and the arm 106 and between the arm 106 and a head 134 formed on the outer end of the portion 122. It will be observed that the pin is tightly secured to the support bracket by means of a nut 136 which is threaded on the reduced portion 126 of the pin, said nut abutting through a washer 138 against the outer side of ear 116 of the support bracket. It will be observed that overcompression of the shear sandwiches or resilient units, each of which comprises a pad of resilient material 140 between spaced washers 142 vulcanized thereto, is prevented by abutment of the shoulder 125 with the external side of the ear 114.

In the present embodiment, after some wear has taken place in the opening 124 in the control arm and in the bushed opening of the head 110 of the hanger, lateral movement or swinging of the hanger is yieldingly restricted by the resilient units 130 and 132 which are stressed in compression. Rotational movement of the hanger and the control arm, which is an integral part of the hanger, is restricted by the resilient units which are stressed in shear during rotational or pivotal movement of the hanger. It will be noted that the resilient units as in the previous embodiment serve to release the brakes and that the arrangement shown in the present embodiment possesses substantially all the features discussed in connection with the previous embodiment.

Referring now to Figure 5 illustrating another embodiment of the invention, the hanger 200 is bifurcated at its upper end to provide spaced portions, one of said portions 202 being a continuation of the body portion 204 of the hanger and terminating at its upper end in a head 206 received between spaced lugs or ears 208 and 210 of a support bracket 211 which may be part of an associated truck frame. The other portion of the bifurcated upper end of the hanger may be in the form of an integral control arm 212 which may extend from one side of the body portion of the hanger upwardly around the external side of lug 208 of the brake hanger bracket. The hanger may be pivotally secured to the bracket 211 by a pin 214 extending through complementary aligned openings in the spaced ears of the brake hanger bracket and through a bushed opening 218 in the head 206 of the hanger. The pin 214 is provided with a head 220 preferably of cylindrical form, said head being snugly fitted within a cylindrical sleeve 222 of a resilient unit 224 which may be fitted into a complementary opening 226 in the control arm 212, as hereinafter more fully described. The hanger and the control arm are thus afforded a pivot on a common axis. The pivot opening 218 is shown slightly worn whereby the hanger is accommodated lateral pendulous swinging.

The sleeve 222 may be formed with an inturned flange 228 at its inner end which may be interposed between the head of the pin and the outer side of ear 208 for tight engagement therewith by means of a nut 230 threaded on the pin 214 and in abutment through a washer 232 with the outer side of the ear 210. The resilient unit may comprise an outer sleeve 234 spaced radially outwardly with respect to the inner sleeve and pressfitted into the opening 226 in the upper end of the control arm 212. The outer sleeve may be provided with an outturned flange 236 pressed against the outer side of the control arm and connected to the arm as by welding at 237. A resilient bushing 238, such as rubber, may be interposed between the sleeves 222 and 234 and vulcanized thereto. The resilient bushing may be tapered at opposite ends thereof toward the inner sleeve in order to accommodate flow of the material constituting the bushing when the hanger oscillates laterally and compresses the bushing. The inner sleeve may be provided with an outturned flange as at 240 in abutment with the adjacent end of the bushing to stabilize the action of the bushing.

The hanger is rotatable with the control arm and, on rotation, the control arm stresses the resilient unit in shear thereby controlling pivotal movement of the hanger. The resilient unit is also operative to effect release of the brakes. Lateral oscillations of the hanger are yieldingly resisted by the resilient unit which is stressed in compression.

It will be noted that in all three embodiments the resilient unit and the control arm are effective to restrain free swinging of the hanger and thus the parts connected thereto. The means to effect this object are simple, and the resilient units in all the embodiments are arranged in an efficient manner and cannot be over-compressed by forces exerted longitudinally of the hanger. The movements of the hanger in its normal plane are resisted by stressing the resilient units in shear and movements of the hanger in abnormal planes are resisted by the units in compression and shear. It will be noted that the legs are spaced far enough apart to accommodate application of the hanger to brackets with lugs of varying thickness and spaced different distances apart.

It will also be understood that in the first and last embodiments the engagement between each resilient unit and the control arm may be along noncircular surfaces.

I claim:

1. In a brake arrangement, a support comprising a pair of spaced lugs, a hanger extending between said lugs, a pivot element extending through said lugs and hanger affording a pivotal connection therebetween, a head on said element disposed adjacent the external side of one of said lugs, a resilient unit having an inner sleeve mounted on said head and comprising a portion interposed between said head and said external side of said one lug, securing means on the other end of said element in abutment with the external side of the other lug for securing said element to said lugs and drawing said head tightly against said portion of said sleeve and said portion against said one lug, a resilient member fitted onto said sleeve and secured thereto, an outer sleeve secured on said resilient element, and rigid means extending from said hanger and connected to said outer sleeve.

2. In a brake arrangement, a support comprising a pair of spaced lugs, a hanger having a portion between said lugs, a control member adjacent the external side of one of said lugs and integral with said hanger, a pivot element extending through said member, lugs and portion, abutment means at opposite ends of said element, one of said abutment means engaging the external side of one of said lugs, and resilient shear sandwiches mounted on said element at opposite sides of said member, one of said sandwiches being compressed between the external side of the other lug and the adjacent side of said member and the other of said sandwiches being compressed between the other of said abutment means on said element and the adjacent side of said member.

3. In a brake arrangement, a bracket comprising a pair of spaced lugs, a hanger having a portion between said lugs, a control member connected to said hanger at a point spaced from said portion, a pivot pin having an enlarged cylindrical part extending through said member and abutting the external side of one lug and having a reduced cylindrical part extending from said enlarged part through said lugs and said hanger portion, securing means on said reduced part in abutment with the external side of the other of said lugs, abutment means on said pin, and resilient means on said enlarged part at opposite sides of said member and compressed between the member and said one lug and said abutment means, respectively.

4. In a brake arrangement, a brake hanger bracket comprising spaced substantially parallel supports, a hanger extending therebetween, a bolt extending through aligned openings in said hanger and said supports affording a pivotal connection therebetween, abutment means at one end of said bolt, a nut threaded on the other end of said bolt, said abutment means and nut engaging the remote sides of said supports, an arm integral with said hanger and pivoted on said abutment means, and resilient means under compression interposed between said arm and the adjacent support and between a head on said bolt and said arm.

5. In a brake arrangement, a support, a hanger, a pivot element secured to said support and extending through said hanger and affording a pivotal connection therebetween, resilient means connected to said element and support, a member connected at one end to said hanger intermediate the ends thereof and at the other end to said resilient means, said resilient means being formed and arranged to be compressed between said member and said element upon pendulous lateral movement of said hanger and to be stressed in shear during other movements of said hanger, the connection between said resilient means and said element and support comprising an abutment on said element, a sleeve connected to said resilient means and surrounding said abutment, and a portion of said sleeve secured between said abutment and said support.

6. In a brake assembly, a support, a hanger having spaced legs, an element connected to the support and extending through said legs, spaced resilient means compressed between a leg and said element and between said leg and said support for resisting movements of said hanger, said element being arranged to draw said resilient means, leg and support together, and abutment means on said element engageable with said support after a predetermined compression of said resilient means to prevent overcompression thereof.

7. In a brake arrangement, a support, a hanger, a control arm spaced from said support and connected to said hanger intermediate the ends thereof, a pivot element extending through openings in said arm, support, and hanger, said hanger having engagement with said element along rigid surfaces, and resilient means mounted on said element in engagement with said arm and formed and arranged to be stressed in compression upon lateral pendulous movement of said hanger and to be stressed in shear during other movements of the hanger.

8. In a brake arrangement, a hanger having spaced legs, a support, a pivot element extending through said legs and said support and secured to the latter, one of said legs engaging said element along rigid bearing areas, and resilient means interposed between the other of said legs and said element and connected thereto and operative in conjunction with said other leg to yieldingly resist movements of said hanger on said element.

9. In a brake arrangement, a support, a hanger having a bifurcated extremity including spaced legs, pivot means extending through said legs and support, and resilient means mounted on said pivot means in engagement with one of said legs and cooperative therewith for controlling movements of said hanger, the other of said legs engaging said pivot means along rigid areas.

10. In a brake arrangement, a support, a hanger having spaced legs, pivot means extending through said legs and support, at least one of said legs engaging said pivot means along rigid areas, and resilient means mounted on said pivot means in engagement with the other of said legs for cooperation therewith to resist movements of said hanger.

11. In a brake arrangement, a support comprising spaced lugs, a hanger having a bifurcated extremity including spaced legs intercalated with said lugs, a pivotal securing element extending through said legs and lugs, and resilient means mounted on said element in engagement with one of said legs and adapted to be stressed between said leg and element to yieldingly resist movements of said hanger.

12. In a brake arrangement, a support bracket, a hanger, a pivot element securing said hanger to said support bracket, a resilient unit secured to said support bracket, said unit comprising inner and outer telescoped sleeves, a resilient element between said sleeves and secured thereto, a member disposed at one side of said hanger and connected at spaced points to one of said sleeves and to said hanger, abutment means on said element, and a radially extending flange on the other sleeve secured on said element and clamped between said support bracket and said abutment means.

13. In a brake mechanism, a hanger bracket comprising spaced lugs, a hanger having spaced portions intercalated with said lugs, a pivot element extending through said lugs and portions, one of said portions engaging said element, and flexible means interposed between the other of said portions and said element.

14. In a brake arrangement, a bracket comprising a pair of spaced generally parallel depending lugs, a hanger having its upper end interposed between said lugs, a bolt and nut assembly extending through said lugs and the upper end of said hanger and having abutment means at opposite ends tightly engaging the external sides of said lugs and securing said assembly thereto, and a control member extending from intermediate the ends of said hanger upwardly adjacent the external side of one of said lugs and pivoted on the adjacent abutment means, said hanger and member being pivoted on a common axis, said control arm being operative to resist certain movements of said hanger.

15. In a brake arrangement, a support comprising spaced portions, a hanger extending between said portions, pivot means extending through the portions and hanger and pivotally interconnecting the same, said pivot means comprising a cylindrical part tightly engaging the external side of a portion, and a control member extending from the hanger and pivoted on said cylindrical part, said hanger and control member being pivoted on a common axis, and said control member being operative to resist certain movements of the hanger.

WALTER H. BASELT.

REFERENCES CITED

The following references are of record in the file of this patent:

UNITED STATES PATENTS

| Number | Name | Date |
|---|---|---|
| 6,988 | Kimball et al. | Jan. 1, 1850 |
| 978,291 | Helmus | Dec. 13, 1910 |
| 1,766,882 | Chryst | June 24, 1930 |
| 1,913,513 | Rossman et al. | June 13, 1933 |
| 1,958,119 | Tarr | May 8, 1934 |
| 2,043,015 | Shutts | June 2, 1936 |
| 2,246,894 | Oelkers | June 24, 1941 |
| 2,366,860 | Kraft | Jan. 9, 1945 |